(12) United States Patent
Umemoto et al.

(10) Patent No.: US 7,675,736 B2
(45) Date of Patent: Mar. 9, 2010

(54) SOLID ELECTROLYTIC CAPACITOR AND PRODUCTION METHOD THEREOF

(75) Inventors: Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 1 day.

(21) Appl. No.: 12/200,088

(22) Filed: Aug. 28, 2008

(65) Prior Publication Data
US 2009/0059478 A1  Mar. 5, 2009

(30) Foreign Application Priority Data
Aug. 29, 2007  (JP) .............................. 2007-222099

(51) Int. Cl.
*H01G 9/00* (2006.01)

(52) U.S. Cl. .................. 361/523; 361/525; 361/528; 361/529; 361/516; 361/519; 29/25.01; 29/25.03

(58) Field of Classification Search .................. 361/523, 361/516–519, 525, 528–529, 503–504, 540–541, 361/532, 508–512; 29/25.01, 25.03
See application file for complete search history.

(56) References Cited

U.S. PATENT DOCUMENTS 6,190,805 B1 * 2/2001 Takeuchi et al. ............ 429/307
6,819,544 B1 * 11/2004 Nielsen et al. .............. 361/508
6,965,510 B1 * 11/2005 Liu et al. .................... 361/529
7,002,790 B2 * 2/2006 Hossick-Schott et al. ... 361/516
7,116,547 B2 * 10/2006 Seitz et al. .................. 361/516
7,554,792 B2 * 6/2009 Ning ........................... 361/516

FOREIGN PATENT DOCUMENTS

| JP | 09-246114 A | 9/1997 |
| JP | 2001-267186 A | 9/2001 |

* cited by examiner

*Primary Examiner*—Nguyen T Ha
(74) *Attorney, Agent, or Firm*—Marvin A. Motsenbocker; Mots Law, PLLC

(57) ABSTRACT

A solid electrolytic capacitor including: an anode containing a valve metal or its alloy; a dielectric layer provided on the surface of the anodic; a cathode provided on the surface of the dielectric layer; and an outer package resin covering the anode, the dielectric layer and the cathode, wherein a glass transition temperature (Tgb) of the outer package resin is a temperature ranging from 0.50 to 0.90 times a maximum glass transition temperature (Tga) which is a maximum value of glass transition temperatures exhibited by the outer package resin after each heat treatment at variable temperatures of every 10° C. from 50° C. to 200° C. (treatment time: 5 hours) which is performed on the outer package resin before a curing process.

7 Claims, 1 Drawing Sheet

SOLID ELECTROLYTIC CAPACITOR AND PRODUCTION METHOD THEREOF

BACKGROUND OF THE INVENTION

1. Field of the invention

The present invention relates to a solid electrolytic capacitor using a valve metal or its alloy as an anode and a production method thereof.

2. Description of the Related Art

Conventionally, there is known a solid electrolytic capacitor in which an anode formed of a valve metal or its alloy is anode-oxidized in an aqueous solution of phosphoric acid or the like, to form a metal oxide layer which is a dielectric member on the surface. On the dielectric layer formed by anode oxidation, an electrolyte layer formed of manganese dioxide or the like is formed, and this leads a problem of an increase in equivalent series resistance (ESR) because of a low conductivity of manganese dioxide compared to a metal or the like.

It has been proposed to reduce ESR by using a conductive polymer instead of manganese dioxide as an electrolyte layer. However, in a solid electrolytic capacitor in which a conductive polymer is used as an electrolyte layer, there is a problem that a leak current is large compared to a solid electrolytic capacitor using manganese dioxide as an electrolyte layer. In particular, in the case of a solid electrolytic capacitor in which niobium is used as an anode, an oxide layer which is a dielectric layer is susceptible to heat and weak to pressure, so that a problem arises in which a leak current increases in a step of forming an outer package for sealing a device.

In order to reduce such a leak current, Japanese Patent Application Laid-open Publication No. 9-246114 proposes to form an outer package, perform heat treatment for curing, make a capacitor device absorb moisture, perform aging treatment by applying voltage under high temperature, and dry the absorbed moisture after the aging treatment.

Japanese Patent Application Laid-open Publication No. 2001-267186 proposes to reduce a leak current by performing drying in at least two stages as a drying condition after aging treatment, thereby reducing deterioration in a dielectric oxide layer.

However, these methods complicate a manufacturing process, and have a problem that reduction in a leak current is insufficient.

SUMMARY OF THE INVENTION

It is an object of the present invention to provide a solid electrolytic capacitor capable of reducing a leak current, and suppressing a decrease in capacitance during high temperature storage, and a production method thereof.

The present invention provides a solid electrolytic capacitor including: an anode containing a valve metal or its alloy; a dielectric layer provided on the surface of the anode; a cathode provided on the surface of the dielectric layer; and an outer package resin covering the anode, the dielectric layer and the cathode, in which the glass transition temperature (Tgb) of the outer package resin is a temperature ranging from 0.50 to 0.90 times a maximum glass transition temperature (Tga) which is a maximum value of glass transition temperatures exhibited by the outer package resin after each heat treatment at variable temperatures of every 10° C. from 50° C. to 200° C. (treatment time: 5 hours) which is performed on the outer package resin before a curing process.

In the present invention, the glass transition temperature (Tgb) of the outer package resin is a temperature ranging from 0.50 to 0.90 times a maximum glass transition temperature (Tga). Since the glass transition temperature (Tgb) of the outer package resin is a temperature that is 0.9 or less times the maximum glass transition temperature (Tga), the influence of heat and stress extend on the dielectric layer is small in a step of molding the outer package resin, and generation of a defect in the dielectric layer and diffusion of oxygen can be prevented. As a result, an increase in a leak current can be suppressed. Further, since the glass transition temperature (Tgb) of the outer package resin is 0.50 or more times the maximum glass transition temperature (Tga), the outer package resin can block entry of moisture from the outside, and hence to reduce deterioration in capacitance during a high temperature storage test. Therefore, it is possible to increase the capacitance retention.

In the present invention, it is more preferred that the glass transition temperature (Tgb) of the outer package resin is a temperature ranging from 0.60 to 0.85 times the maximum glass transition temperature (Tga). By selecting the temperature within such a range, it is possible to further reduce the leak current and to suppress a reduction in the capacitance during high temperature storage.

In the present invention, the outer package resin may be any resin without any particular limitation insofar as it can be used for sealing the solid electrolytic capacitor, and a thermosetting resin composition that is generally used as a molding compound for electronic components can be used. A thermosetting resin used as a molding compound generally includes a resin, a filler, a curing agent, a curing accelerator, a plasticizer and so on. As the resin, an epoxy resin is preferably used. When an epoxy resin is used as a resin, e.g., silica particles are used as a filler; e.g., a phenol resin is used as a curing agent; e.g., an imidazole compound is used as a curing accelerator; and e.g., silicone is used as a plasticizer.

Examples of kinds of the epoxy resin include a biphenyl type, a cresol novolac type, a naphthalene-containing novolac type, a bisphenol A novolac type, a tris-phenol methane type, a tetrakis-phenol ethane type, a dicyclopentadiene type and the like.

Examples of the curing accelerator include an imidazole compound, an amine compound, a phosphorus compound and the like.

By using an epoxy resin as a resin, it is possible to obtain high sealability, and to obtain excellent mechanical characteristics, thermal characteristics, and electric characteristics. Further, by using an imidazole compound as a curing accelerator, it is possible to further alleviate the influence of heat and stress, and to further reduce the leak current.

In the present invention, an anode is formed of a material containing a valve metal or its alloy. As the valve metal, metals such as niobium, tantalum, titanium, and aluminum can be recited. As an alloy mainly based on a valve metal, alloys mainly based on these metals can be recited. Likewise niobium monoxide, an anode may be formed of oxide of such a metal. In the present invention, an anode is preferably formed of niobium or an alloy mainly based on niobium, or of niobium monoxide. By using these as anode materials, it is possible to increase the dielectric constant of the dielectric layer compared to the case of an anode using tantalum, and to achieve a solid electrolytic capacitor of a large capacitance having excellent leak current characteristics and reliability characteristics.

A production method of the present invention is a method capable of producing the aforementioned solid electrolytic capacitor of the present invention, and includes the steps of: forming an anode containing a valve metal or its alloy; forming a dielectric layer on the surface of the anode; forming a cathode on the dielectric layer; and forming an outer package resin so as to cover the anode, the dielectric layer and the cathode, in which the step of forming the outer package resin includes the step of curing by heat treatment so that a glass transition temperature (Tgb) of the outer package resin becomes a temperature ranging from 0.50 to 0.90 times a maximum glass transition temperature (Tga) which is a maximum value of glass transition temperatures exhibited by the outer package resin after each heat treatment at variable temperatures of every 10° C. from 50° C. to 200° C. (treatment time: 5 hours) which is performed on the outer package resin before a curing process.

According to the production method of the present invention, since the molded outer package resin is allowed to set by heat treatment so that the glass transition temperature (Tgb) after the curing process becomes a temperature ranging from 0.50 to 0.90 times, preferably 0.60 to 0.85 times the maximum glass transition temperature (Tga), it is possible to reduce the heat and stress exerted on the dielectric layer in the curing heat treatment, and generation of a defect, diffusion of oxygen and the like in the dielectric layer can be suppressed, and the leak current can be suppressed. Further, it is possible to ensure a moisture blocking effect by the outer package resin and to make a capacitance retention large while reducing deterioration in capacitance in a high temperature storage test.

For performing heat treatment so that the glass transition temperature (Tgb) after the curing process becomes a temperature ranging from 0.50 to 0.90 times the maximum glass transition temperature (Tga), as described above, for example, a heat treatment temperature (T1) is preferably a temperature of 0.80 or less times a heat treatment temperature (T2) that gives the maximum glass transition temperature (Tga).

The glass transition temperature (Tgb) in the present invention may be determined by a measurement method according to Japanese Industrial Standards (JIS) C6481.

In the solid electrolytic capacitor of the present invention, since the glass transition temperature (Tgb) of the outer package resin is a temperature ranging from 0.50 to 0.90 times the maximum glass transition temperature (Tga), the leak current is small, and a reduction in capacitance during high temperature storage can be suppressed.

Also according to the production method of the present invention, it is possible to produce a solid electrolytic capacitor in which a leak current is small, and capable of suppressing a reduction in capacitance during high temperature storage.

DETAILED DESCRIPTION OF THE PREFERRED EMBODIMENTS

In the following, the present invention will be explained more specifically based on one embodiment of the present invention, however, the present invention will not be limited in any way to this embodiment, and may be appropriately modified in practice without departing from the scope of the invention.

Figure 1:
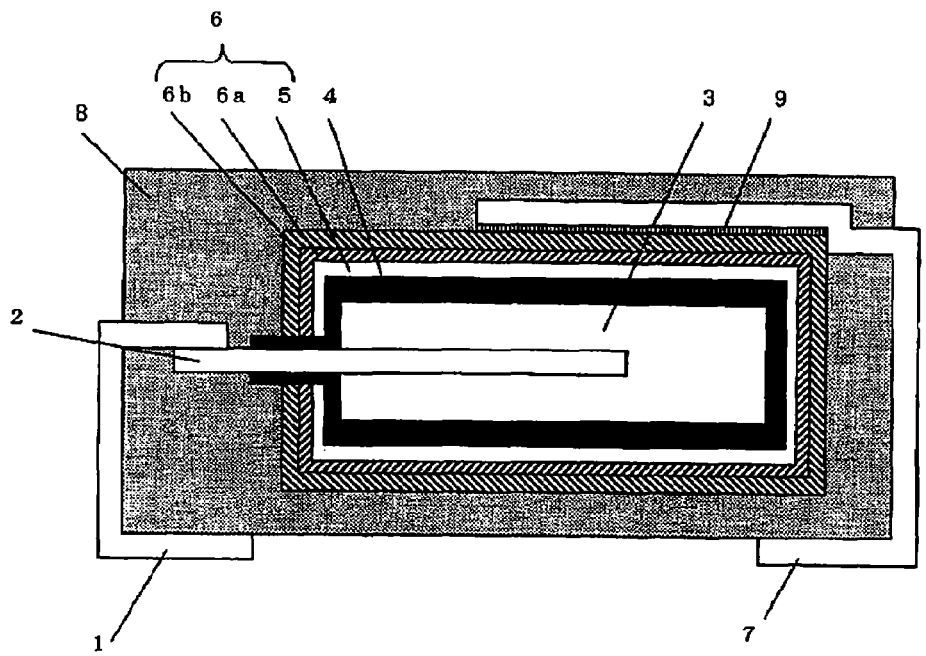
FIG. 1 is a schematic section view showing a solid electrolytic capacitor of one embodiment according to the present invention.

FIG. 1 is a schematic section view showing one embodiment of the solid electrolytic capacitor according to the present invention.

As shown in FIG. 1, on the surface of an anode 3 that is formed by molding a valve metal powder and sintering in vacuo, a dielectric layer 4 formed of oxide is formed. Since the anode 3 is a porous sintered body, the dielectric layer 4 is formed also in its inside face. The dielectric layer 4 may be formed, for example, by anode-oxidizing the surface of the anode 3 with an aqueous solution of phosphoric acid or the like.

On the dielectric layer 4, a dielectric layer 5 is formed. The electrolyte layer 5 is also formed on the dielectric layer 4 inside the anode 3. The electrolyte layer 5 may be formed of manganese dioxide or a conductive polymer. As the conductive polymer, polyethylene dioxythiophene, polypyrrole, polythiophene, polyaniline and the like can be exemplified.

On the electrolyte layer 5 of the outer circumference of the anode 3, a carbon layer 6a is formed, and a silver layer 6b is formed on the carbon layer 6a. The carbon layer 6a may be formed by applying carbon paste, followed by drying. The silver layer 6b may also be formed by applying silver paste, followed by drying. A cathode 6 is made up of the electrolyte layer 5, the carbon layer 6a and the silver layer 6b. The cathode 6 is connected with a cathode lead frame 7 via an adhesive layer 9, and an anode lead 2 is connected to an anode lead frame 1.

The anode 3, the dielectric layer 4, and the cathode 6 are covered and sealed with an outer package resin 8 formed of an epoxy resin or the like.

In the following, concrete examples will be explained.

EXAMPLES

Example 1

(Step 1)
An anode formed from a niobium porous sintered body of about 4.4 mm high, about 3.3 mm wide, and about 1.0 mm deep was formed by filling a part of an anode lead with a niobium metal powder having an average primary particle size of about 0.5 μm and sintering the same in vacuum.

(Step 2)
This anode was subjected to anode oxidation for about 10 hours at a constant voltage of about 10 V in an aqueous solution of ammonium fluoride of about 0.1% by weight kept at about 40° C., and then a dielectric layer containing fluorine having subjected to anode oxidation for about 2 hours at a constant voltage of about 10 V in an aqueous solution of phosphoric acid of about 0.5% by weight kept at about 60° C. was formed on the surface of the anode.

(Step 3)
On the surface of the dielectric layer, an electrolyte layer formed of polypyrrole was formed, for example, by chemical polymerization or the like, and then carbon paste and silver paste were respectively applied and dried, to give a carbon layer and a silver layer. To a cathode made up of the electrolyte layer, the carbon layer, and the silver layer thus formed, a cathode lead frame was adhered via an adhesive layer, while an anode lead frame was adhered to the anode lead.

(Step 4)
On the circumference of a device manufactured in the manner as described above, an outer package resin was molded by a transfer molding method using a molding compound A. The molding compound A contains is formed by containing silica particles serving as a filler, a phenol resin serving as a curing agent, an imidazole compound serving as a curing accelerator, and silicone serving as a plasticizer in an epoxy resin. Here, the epoxy resin is a biphenyl type epoxy resin, and the epoxy resin that is used in other molding compound as will be described later is also a biphenyl type epoxy resin.

After molding an outer package resin in the manner as described above, the outer package resin was allowed to set by being left at room temperature (25° C.) as a curing process, to form an outer package resin Al, and whereby a solid electrolytic capacitor was prepared.

[Measurement of Glass Transition Temperature]

As for the outer package resin Al formed in the above Step 4, a glass transition temperature was measured by a TMA method (Thermo-mechanical analysis method). Here, measurement according to the TMA method was performed using TMA4000SA manufactured by Bruker AXA.

Figure 2:
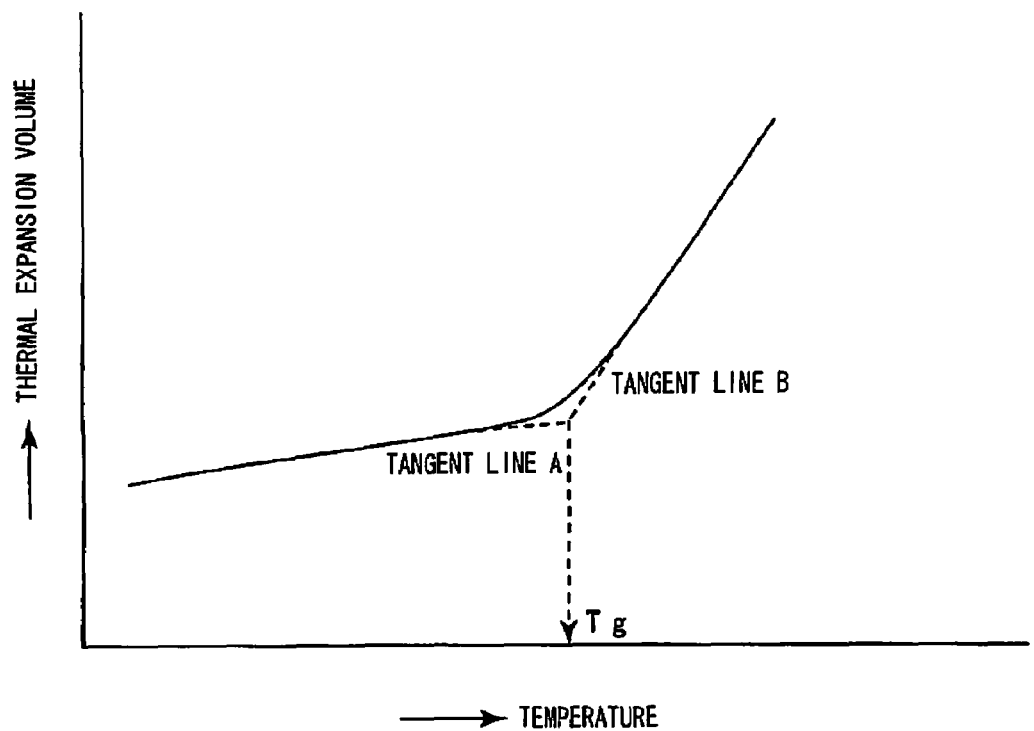
FIG. 2 is a view for explaining a method of measuring a glass transition temperature.

First, an arbitrary part of the outer package resin was cut out to give a test piece having a thickness of about 1.0 mm and a diameter of 5 mm or less. At this time, processing was made so that thickness directions were parallel as much as possible. The test piece was set so that it is measured in the thickness direction, and the temperature was raised at a rate of 10° C./min from room temperature, and a thermal expansion (contraction) amount in the thick direction was measured. Then, a chart as shown in FIG. 2, that represents a temperature on the horizontal axis, and a thermal expansion (contraction) amount on the vertical axis is prepared. As shown in FIG. 2, a tangent line A and a tangent line B are drawn on a curve before and after a flexion point, and an intersection point between the tangent line A and the tangent line B is determined as a glass transition temperature. In other words, the point where the thermal expansion curve inflects at the lowest temperature with respect to temperature is regarded as a glass transition temperature. Further, the glass transition temperature was measured for two test pieces at arbitrarily positions in the outer package resin, and an average value thereof is taken as a glass transition temperature.

The glass transition temperature (Tgb) of the outer package resin Al formed by using a molding compound A measured according to the method as described above was 132° C. The outer package resin that was molded by using the molding compound A and prior to the curing process was heat-treated by retaining for 5 hours at temperatures of every 10° C. from 50° C. to 200° C. In other words, heat treatment was performed by retaining for 5 hours at either temperature of 50° C., 60° C., 70° C., . . . 180° C., 190° C. and 200° C. Next, for the test pieces that were treated at the respective temperatures, the glass transition temperature was measured according to the TMA method in a similar manner as described above. As a result, the glass transition temperature of the test piece that is heat-treated for 5 hours at 150° C. was 175° C. which was the highest. Therefore, a maximum glass transition temperature (Tga) is 175° C.

Therefore, the glass transition temperature (Tgb) of the outer package resin Al after the curing process in the above Step 4 is 0.75 times the maximum glass transition temperature (Tga).

Therefore, a heat treatment temperature (T1) in the above Step 4 is 25° C., and a heat treatment temperature (T2) that gives the maximum glass transition temperature (Tga) of the outer package resin Al is 150° C.

Example 2

A solid electrolytic capacitor was prepared in a similar manner to Example 1, except that an outer package resin B1 was prepared using a molding compound B having a different composition from the molding compound A and containing an epoxy resin and an imidazole compound in Step 4 of the above Example 1.

A glass transition temperature was measured in a similar manner for the outer package resin B1, to reveal that a Tgb was 130° C., a Tga was 185° C., and a heat treatment temperature (T2) was 140° C. Therefore, in the above outer package resin B1, the Tgb is 0.70 times the Tga.

Example 3

A solid electrolytic capacitor was prepared in a similar manner in Example 1, except that an outer package resin C1 was prepared using a molding compound C having a different composition from the molding compound A and containing an epoxy resin and an imidazole compound in Step 4 of the above Example 1.

A glass transition temperature was measured in a similar manner for the outer package resin C1, to reveal that a Tgb was 110° C., a Tga was 178° C., and a heat treatment temperature (T2) was 150° C. Therefore, in the above outer package resin C1, the Tgb is 0.62 times the Tga.

Example 4

A solid electrolytic capacitor was prepared in a similar manner to Example 1, except that an outer package resin D1 was prepared using a molding compound D having a different composition from the molding compound A and containing an epoxy resin and an amine compound in Step 4 of the above Example 1.

A glass transition temperature was measured in a similar manner for the outer package resin D1, to reveal that a Tgb was 95° C., a Tga was 190° C., and a heat treatment temperature (T2) was 200° C. Therefore, in the above outer package resin D1, the Tgb is 0.50 times the Tga.

Example 5

A solid electrolytic capacitor was prepared in a similar manner to Example 1, except that an outer package resin E1 was prepared using a molding compound E having a different composition from the molding compound A and containing an epoxy resin and an amine compound in Step 4 of the above Example 1 and a curing temperature (T1) was 60° C.

A glass transition temperature was measured in a similar manner for the outer package resin E1, to reveal that a Tgb was 100° C., a Tga was 188° C., and a heat treatment temperature (T2) was 200° C. Therefore, in the above outer package resin E1, the Tgb is 0.53 times the Tga.

In the following, examples in which solid electrolytic capacitors are prepared in various curing temperatures (T1) after performing transfer mold using the molding compound A will be shown.

Example 6

A solid electrolytic capacitor was prepared in a similar manner to Example 1, except that an outer package resin A2 was formed by performing heat treatment for 5 hours at 50° C. as a curing process in Step 4 of the above Example 1.

A glass transition temperature was measured in a similar manner for the outer package resin A2, to reveal that a Tgb was 138° C. A Tga and a heat treatment temperature (T2) were as same as those in Example 1. Therefore, in the above outer package resin A2, the Tgb is 0.79 times the Tga.

Example 7

A solid electrolytic capacitor was prepared in a similar manner to Example 1, except that an outer package resin A3 was formed by performing heat treatment for 5 hours at 60° C. as a curing process in Step 4 of the above Example 1.

A glass transition temperature was measured in a similar manner for the outer package resin A3, to reveal that a Tgb was 143° C. A Tga and a heat treatment temperature (T2) were as same as those in Example 1. Therefore, in the above outer package resin A3, the Tgb is 0.82 times the Tga.

Example 8

A solid electrolytic capacitor was prepared in a similar manner to Example 1, except that an outer package resin A4 was formed by performing heat treatment for 5 hours at 70° C. as a curing process in Step 4 of the above Example 1.

A glass transition temperature was measured in a similar manner for the outer package resin A4, to reveal that a Tgb was 145° C. Tga and heat treatment temperature (T2) were as same as those in Example 1. Therefore, in the above outer package resin A4, the Tgb is 0.83 times the Tga.

Example 9

A solid electrolytic capacitor was prepared in a similar manner to Example 1, except that an outer package resin A5 was formed by performing heat treatment for 5 hours at 80° C. as a curing process in Step 4 of the above Example 1.

A glass transition temperature was measured in a similar manner for the outer package resin AS, to reveal that a Tgb was 148° C. A Tga and a heat treatment temperature (T2) were as same as those in Example 1. Therefore, in the above outer package resin A5, the Tgb is 0.85 times the Tga.

Example 10

A solid electrolytic capacitor was prepared in a similar manner to Example 1, except that an outer package resin A6 was formed by performing heat treatment for 5 hours at 90° C. as a curing process in Step 4 of the above Example 1.

A glass transition temperature was measured in a similar manner for the outer package resin A6, to reveal that a Tgb was 150° C. A Tga and a heat treatment temperature (T2) were as same as those in Example 1. Therefore, in the above outer package resin A6, the Tgb is 0.86 times the Tga.

Example 11

A solid electrolytic capacitor was prepared in a similar manner to Example 1, except that an outer package resin A7 was formed by performing heat treatment for 5 hours at 100° C. as a curing process in Step 4 of the above Example 1.

A glass transition temperature was measured in a similar manner for the outer package resin A7, to reveal that a Tgb was 152° C. A Tga and a heat treatment temperature (T2) were as same as those in Example 1. Therefore, in the above outer package resin A7, the Tgb is 0.87 times the Tga.

Example 12

A solid electrolytic capacitor was prepared in a similar manner to Example 1, except that an outer package resin A8 was formed by performing heat treatment for 5 hours at 110° C. as a curing process in Step 4 of the above Example 1.

A glass transition temperature was measured in a similar manner for the outer package resin A8, to reveal that a Tgb was 155° C. A Tga and a heat treatment temperature (T2) were as same as those in Example 1. Therefore, in the above outer package resin A8, the Tgb is 0.89 times the Tga.

Example 13

A solid electrolytic capacitor was prepared in a similar manner to Example 1, except that an outer package resin A9 was formed by performing heat treatment for 5 hours at 120° C. as a curing process in Step 4 of the above Example 1.

A glass transition temperature was measured in a similar manner for the outer package resin A9, to reveal that a Tgb was 157° C. A Tga and a heat treatment temperature (T2) were as same as those in Example 1. Therefore, in the above outer package resin A9, the Tgb is 0.90 times the Tga.

Comparative Example 1

A solid electrolytic capacitor was prepared in a similar manner to Example 1, except that an outer package resin A10 was formed by performing heat treatment for 5 hours at 130° C. as a curing process in Step 4 of the above Example 1.

A glass transition temperature was measured in a similar manner for the outer package resin A10, to reveal that a Tgb was 160° C. A Tga and a heat treatment temperature (T2) were as same as those in Example 1. Therefore, in the above outer package resin A10, the Tgb is 0.91 times the Tga.

Comparative Example 2

A solid electrolytic capacitor was prepared in a similar manner to Example 1, except that an outer package resin All was formed by performing heat treatment for 5 hours at 140° C. as a curing process in Step 4 of the above Example 1.

A glass transition temperature was measured in a similar manner for the outer package resin A11, to reveal that a Tgb was 174° C. A Tga and a heat treatment temperature (T2) were as same as those in Example 1. Therefore, in the above outer package resin A11, the Tgb is 0.99 times the Tga.

Comparative Example 3

A solid electrolytic capacitor was prepared in a similar manner to Example 1, except that an outer package resin A12 was formed by performing heat treatment for 5 hours at 150° C. as a curing process in Step 4 of the above Example 1.

A glass transition temperature was measured in a similar manner for the outer package resin A12, to reveal that a Tgb was 175° C. A Tga and a heat treatment temperature (T2) were as same as those in Example 1. Therefore, in the above outer package resin A12, the Tgb is 1.00 times the Tga.

Next, examples in which solid electrolytic capacitors are prepared by using different kinds of molding compounds while fixing a curing process temperature (T1) at 170° C. will be shown.

Comparative Example 4

A solid electrolytic capacitor was prepared in a similar manner to Example 1, except that an outer package resin A13 was formed by performing heat treatment for 5 hours at 170° C. as a curing process in Step 4 of the above Example 1.

A glass transition temperature was measured in a similar manner for the outer package resin A13, to reveal that a Tgb was 173° C. A Tga and a heat treatment temperature (T2) were as same as those in Example 1. Therefore, in the above outer package resin A13, the Tgb is 0.99 times the Tga.

Comparative Example 5

A solid electrolytic capacitor was prepared in a similar manner to Example 1, except that an outer package resin B2 was formed by using the molding compound B having a different composition from the molding compound A and containing an epoxy resin and an imidazole compound, and performing heat treatment for 5 hours at 170° C. as a curing process in Step 4 of the above Example 1.

A glass transition temperature was measured in a similar manner for the outer package resin B2, to reveal that a Tgb was 184° C. A Tga and a heat treatment temperature (T2) were as same as those in Example 2. Therefore, in the above outer package resin B2, the Tgb is 0.99 times the Tga.

Comparative Example 6

A solid electrolytic capacitor was prepared in a similar manner to Example 1, except that an outer package resin C2 was formed by using the molding compound C having a different composition from the molding compound A and containing an epoxy resin and an imidazole compound, and performing heat treatment for 5 hours at 170° C. as a curing process in Step 4 of the above Example 1.

A glass transition temperature was measured in a similar manner for the outer package resin C2, to reveal that a Tgb was 174° C. A Tga and a heat treatment temperature (T2) were as same as those in Example 3. Therefore, in the above outer package resin C2, the Tgb is 0.98 times the Tga.

Comparative Example 7

A solid electrolytic capacitor was prepared in a similar manner to Example 1, except that an outer package resin D2 was formed by using the molding compound D having a different composition from the molding compound A and containing an epoxy resin and an amine compound, and performing heat treatment for 5 hours at 170° C. as a curing process in Step 4 of the above Example 1.

A glass transition temperature was measured in a similar manner for the outer package resin D2, to reveal that a Tgb was 172° C. A Tga and a heat treatment temperature (T2) were as same as those in Example 4. Therefore, in the above outer package resin D2, the Tgb is 0.91 times the Tga.

Comparative Example 8

A solid electrolytic capacitor was prepared in a similar manner to Example 1, except that an outer package resin E2 was formed by using the molding compound E having a different composition from the molding compound A and containing an epoxy resin and an amine compound, and performing heat treatment for 5 hours at 170° C. as a curing process in Step 4 of the above Example 1.

A glass transition temperature was measured in a similar manner for the outer package resin E2, to reveal that a Tgb was 175° C. A Tga and a heat treatment temperature (T2) were as same as those in Example 5. Therefore, in the above outer package resin E2, the Tgb is 0.93 times the Tga.

Next, examples in which solid electrolytic capacitors are prepared by using the molding compound E and performing curing process at relatively low temperature will be shown.

Comparative Example 9

A solid electrolytic capacitor was prepared in a similar manner to Example 1, except that an outer package resin E3 was formed by using the molding compound E having a different composition from the molding compound A and containing an epoxy resin and an amine compound, and leaving still at room temperature (25° C.) as a curing process in Step 4 of the above Example 1.

A glass transition temperature was measured in a similar manner for the outer package resin E3, to reveal that a Tgb was 85° C. A Tga and a heat treatment temperature (T2) were as same as those in Example 5. Therefore, in the above outer package resin E3, the Tgb is 0.45 times the Tga.

Comparative Example 10

A solid electrolytic capacitor was prepared in a similar manner to Example 1, except that an outer package resin E4 was formed by using the molding compound E having a different composition from the molding compound A and containing an epoxy resin and an amine compound, and performing heat treatment at 50° C. for 5 hours as a curing process in Step 4 of the above Example 1.

A glass transition temperature was measured in a similar manner for the outer package resin E4, to reveal that a Tgb was 90° C. A Tga and a heat treatment temperature (T2) were as same as those in Example 5. Therefore, in the above outer package resin E4, the Tgb is 0.48 times the Tga.

Next, examples in which solid electrolytic capacitors are prepared using the molding compounds D and E having an amine compound in the condition that the Tgb is 0.75 times the Tga as is the same with Example 1 (the molding compound A containing an imidazole compound) will be shown.

Example 14

A solid electrolytic capacitor was prepared in a similar manner to Example 1, except that an outer package resin D3 was formed by using the molding compound D having a different composition from the molding compound A and containing an epoxy resin and an amine compound, and performing heat treatment at 150° C. for 5 hours as a curing process in Step 4 of the above Example 1.

A glass transition temperature was measured in a similar manner for the outer package resin D3, to reveal that a Tgb was 142° C. A Tga and a heat treatment temperature (T2) were as same as those in Example 4. Therefore, in the above outer package resin D3, the Tgb is 0.75 times the Tga.

Example 15

A solid electrolytic capacitor was prepared in a similar manner to Example 1, except that an outer package resin E5 was formed by using the molding compound E having a different composition from the molding compound A and containing an epoxy resin and an amine compound, and performing heat treatment at 150° C. for 5 hours as a curing process in Step 4 of the above Example 1.

A glass transition temperature was measured in a similar manner for the outer package resin E5, to reveal that a Tgb was 141° C. A Tga and a heat treatment temperature (T2) were as same as those in Example 5. Therefore, in the above outer package resin E5, the Tgb is 0.75 times the Tga.

Next, examples in which solid electrolytic capacitors are prepared with variable anode materials will be shown.

Example 16

A solid electrolytic capacitor was prepared in a similar manner to Example 1, except that a niobium monoxide (NbO) powder having an average primary particle size of about 0.5 µm was used in place of a powder of niobium metal having an average primary particle size of about 0.5 µm in Step 1 of the above Example 1. The outer package resin formed at this time is similar to that in Example 1.

Example 17

A solid electrolytic capacitor was prepared in a similar manner to Example 1, except that a tantalum powder having an average primary particle size of about 0.5 µm was used in place of a powder of a niobium metal having an average primary particle size of about 0.5 µm in Step 1 of the above Example 1. The outer package resin formed at this time is similar to that in Example 1.

Comparative Example 11

A solid electrolytic capacitor was prepared in a similar manner to Example 1, except that a tantalum powder having an average primary particle size of about 0.5 µm was used in place of a powder of a niobium metal having an average primary particle size of about 0.5 µm in Step 1 of the above Example 1, and heat treatment at 150° C. for 5 hours was performed as a curing process in Step 4. The outer package resin formed at this time is similar to that in Comparative example 3.

Example 18

In Step 1 of the above Example 1, 1% by weight of an aluminum metal powder was added to a niobium metal powder having an average primary particle size of about 0.5 µm, and mixed for 5 hours by a ball mill. Then molding was made so that a part of an anode lead is embedded, and sintered in vacuo, to form an anode made up of a porous sintered body of a niobium-aluminum alloy of about 4.4 mm high, about 3.3 mm wide and about 1.0 mm deep. A solid electrolytic capacitor was prepared by the process following Step 2 which is as same as that in Example 1. The outer package resin formed at this time is similar to that in Example 1.

Example 19

A solid electrolytic capacitor was prepared in a similar manner to Example 1, except that an outer package resin E6 was formed by using the molding compound E having a different composition from the molding compound A and containing an epoxy resin and an amine compound, and performing heat treatment at 160° C. for 5 hours as a curing process in Step 4 of the above Example 1.

A glass transition temperature was measured in a similar manner for the outer package resin E6, to reveal that a Tgb was 155° C. A Tga and a heat treatment temperature (T2) were as same as those in Example 5. Therefore, in the above outer package resin E6, the Tgb is 0.82 times the Tga.

Example 20

A solid electrolytic capacitor was prepared in a similar manner to Example 1, except that a dielectric layer was formed by performing anode oxidation for 10 hours at a constant voltage of about 10 V in an aqueous solution of phosphoric acid of about 0.5% by weight kept at about 60° C., in Step 2, after production of an anode in Step 1 of the above Example 1. Therefore, in this Example, anode oxidation by ammonium fluoride is not performed. The outer package resin formed at this time is similar to that in Example 1.

(Reliability Test)

Each of the above solid electrolytic capacitors was left still for 1000 hours in a thermostatic chamber kept at 105° C.

(Measurement of Capacitance)

Capacitance at a frequency of 120 Hz of each of the above solid electrolytic capacitors (before and after the reliability test) was measured by means of a LCR meter.

(Measurement of Leak Current)

A voltage of 2.5 V was applied to each solid electrolytic capacitor and a leak current (before and after the reliability test) after 20 seconds was measured.

Table 1 shows a leak current and capacitance retention in the reliability test. The leak current is indicated by a value, relative to the value in the solid electrolytic capacitor of Comparative example 3 being as 1. The capacitance retention in the reliability test is calculated by the following formula, and the closer to 100 the value, the less the deterioration in the capacitance is meant.

(capacitance after reliability test/capacitance before reliability test)×100

TABLE 1

| | Anode | Molding Compound Type | Molding Compound Contained component | Tga | Heat Treatment Temperature That Gives Tga (T2) | Tgb | Heat Treatment Temperature That Gives Tga (T1) | Tgb/Tga | T1/T2 | Leak Current (Relative Value) | Capacitance Retention (%) |
|---|---|---|---|---|---|---|---|---|---|---|---|
| Ex. 1 | Nb | A | Imidazole Type | 175 | 150 | 132 | 25 | 0.75 | 0.17 | 0.08 | 93 |
| Ex. 2 | Nb | B | Imidazole Type | 185 | 140 | 130 | 25 | 0.70 | 0.18 | 0.08 | 93 |
| Ex. 3 | Nb | C | Imidazole Type | 178 | 150 | 110 | 25 | 0.62 | 0.17 | 0.09 | 91 |
| Ex. 4 | Nb | D | Amine Type | 190 | 200 | 95 | 25 | 0.50 | 0.13 | 0.09 | 83 |
| Ex. 5 | Nb | E | Amine Type | 188 | 200 | 100 | 60 | 0.53 | 0.30 | 0.09 | 83 |
| Ex. 6 | Nb | A | Imidazole Type | 175 | 150 | 138 | 50 | 0.79 | 0.33 | 0.09 | 93 |

TABLE 1-continued

| | Anode | Molding Compound Type | Molding Compound Contained component | Tga | Heat Treatment Temperature That Gives Tga (T2) | Tgb | Heat Treatment Temperature That Gives Tga (T1) | Tgb/Tga | T1/T2 | Leak Current (Relative Value) | Capacitance Retention (%) |
|---|---|---|---|---|---|---|---|---|---|---|---|
| Ex. 7 | Nb | A | Imidazole Type | 175 | 150 | 143 | 60 | 0.82 | 0.40 | 0.10 | 95 |
| Ex. 8 | Nb | A | Imidazole Type | 175 | 150 | 145 | 70 | 0.83 | 0.47 | 0.10 | 95 |
| Ex. 9 | Nb | A | Imidazole Type | 175 | 150 | 148 | 80 | 0.85 | 0.53 | 0.11 | 95 |
| Ex. 10 | Nb | A | Imidazole Type | 175 | 150 | 150 | 90 | 0.86 | 0.60 | 0.19 | 95 |
| Ex. 11 | Nb | A | Imidazole Type | 175 | 150 | 152 | 100 | 0.87 | 0.67 | 0.20 | 95 |
| Ex. 12 | Nb | A | Imidazole Type | 175 | 150 | 155 | 110 | 0.89 | 0.73 | 0.22 | 93 |
| Ex. 13 | Nb | A | Imidazole Type | 175 | 150 | 157 | 120 | 0.90 | 0.80 | 0.24 | 95 |
| Comp. Ex. 1 | Nb | A | Imidazole Type | 175 | 150 | 160 | 130 | 0.91 | 0.87 | 0.71 | 95 |
| Comp. Ex. 2 | Nb | A | Imidazole Type | 175 | 150 | 174 | 140 | 0.99 | 0.93 | 0.99 | 93 |
| Comp. Ex. 3 | Nb | A | Imidazole Ttype | 175 | 150 | 175 | 150 | 1.00 | 1.00 | 1.00 | 93 |
| Comp. Ex. 4 | Nb | A | Imidazole Type | 175 | 150 | 173 | 170 | 0.99 | 1.13 | 0.84 | 93 |
| Comp. Ex. 5 | Nb | B | Imidazole Type | 185 | 140 | 184 | 170 | 0.99 | 1.21 | 0.98 | 93 |
| Comp. Ex. 6 | Nb | C | Imidazole Type | 178 | 150 | 174 | 170 | 0.98 | 1.13 | 0.98 | 93 |
| Comp. Ex. 7 | Nb | D | Amine Type | 190 | 200 | 172 | 170 | 0.91 | 0.85 | 0.66 | 93 |
| Comp. Ex. 8 | Nb | E | Amine Type | 188 | 200 | 175 | 170 | 0.93 | 0.85 | 0.71 | 90 |
| Comp. Ex. 9 | Nb | E | Amine Type | 188 | 200 | 85 | 25 | 0.45 | 0.13 | 0.15 | 45 |
| Comp. Ex. 10 | Nb | E | Amine Type | 188 | 200 | 90 | 50 | 0.48 | 0.25 | 0.13 | 48 |
| Ex. 14 | Nb | D | Amine Type | 190 | 200 | 142 | 150 | 0.75 | 0.75 | 0.12 | 95 |
| Ex. 15 | Nb | E | Amine Type | 188 | 200 | 141 | 150 | 0.75 | 0.75 | 0.12 | 95 |
| Ex. 16 | NbO | A | Imidazole Type | 175 | 150 | 132 | 25 | 0.75 | 0.17 | 0.08 | 94 |
| Ex. 17 | Ta | A | Imidazole Type | 175 | 150 | 132 | 25 | 0.75 | 0.17 | 0.10 | 95 |
| Comp. Ex. 11 | Ta | A | Imidazole Type | 175 | 150 | 175 | 150 | 1.00 | 1.00 | 0.63 | 95 |
| Ex. 18 | Nb—Al | A | Imidazole Type | 175 | 150 | 132 | 25 | 0.75 | 0.17 | 0.08 | 94 |
| Ex. 19 | Nb | E | Amine Type | 188 | 200 | 155 | 160 | 0.82 | 0.80 | 0.12 | 95 |
| Ex. 20 | Nb | A | Imidazole Type | 175 | 150 | 132 | 25 | 0.75 | 0.17 | 0.09 | 94 |

As is apparent from the result shown in Table 1, when the glass transition temperature (Tgb) of the outer package resin is 0.9 or less times the maximum glass transition temperature (Tga), the leak current is largely reduced. When the Tgb is less than 0.5 times the Tga, the capacitance retention is significantly reduced. Therefore, in the solid electrolytic capacitor having a small leak current and capable of suppressing a reduction in capacitance during high temperature storage, the glass transition temperature (Tgb) of the outer package resin is a temperature ranging from 0.50 to 0.90 times the maximum glass transition temperature (Tga).

Concretely, the leak current dramatically increases as can be seen from a leak current of 0.24 in Example 13 wherein Tgb/Tga is 0.90, and leak current of 0.71 in Comparative example 1 wherein Tgb/Tga is 0.91. Furthermore, the capacitance retention dramatically increases as can be seen from a capacitance retention of 48% in Comparative example 10 wherein Tgb/Tga is 0.48 and a capacitance retention of 83% in Example 4 wherein Tgb/Tga is 0.50.

When the Tgb/Tga is 0.5 or larger, the capacitance retention is 80% or larger, and when the Tgb/Tga is 0.6 or larger, the capacitance retention is 90% or larger.

When the Tgb/Tga is 0.90 or less, the leak current is less than 0.3, and when the Tgb/Tga is 0.85 or less, the leak current is less than 0.15. Therefore, when the Tgb/Tga falls within a range of 0.6 to 0.85, the leak current is further reduced, and a reduction in capacitance during high temperature storage can be suppressed.

From the result shown in Table 1, it can be seen that Tgb/Tga of 0.90 or less is achieved by making a heat treatment temperature (T1) be 0.80 time or less of a heat treatment temperature (T2) that gives Tga.

Comparison between Example 1 and Example 14 reveals that an imidazole compound is preferred as a component contained in a molding compound.

Further, comparison between Example 1 and Comparative example 3 in which niobium is used as an anode, and Example 17 and Comparative example 11 in which tantalum is used as an anode reveals that the effect of suppressing a leak current according to the present invention appears more greatly by the case where niobium is used as an anode.

The results of Example 1, Example 16 and Example 18 show that the effect of the present invention can be achieved in any cases where the anode is formed of niobium, niobium monoxide, and niobium alloy.

What is claimed is:
1. A solid electrolytic capacitor comprising: an anode containing a valve metal or its alloy; a dielectric layer provided on the surface of the anode; a cathode provided on the surface of the dielectric layer; and an outer package resin covering the anode, the dielectric layer and the cathode, wherein a glass transition temperature (Tgb) of the outer package resin is a temperature ranging from 0.50 to 0.90 times a maximum glass transition temperature (Tga) which is a maximum value of glass transition temperatures exhibited by the outer package resin after each heat treatment at variable temperatures of every 10° C. from 50° C. to 200° C. (treatment time: 5 hours) which is performed on the outer package resin before a curing process.

2. The solid electrolytic capacitor according to claim 1, wherein the glass transition temperature (Tgb) of the outer package resin is a temperature ranging from 0.60 to 0.85 times the maximum glass transition temperature (Tga).

3. The solid electrolytic capacitor according to claim 1, wherein the outer package resin contains an epoxy resin.

4. The solid electrolytic capacitor according to claim 1, wherein the outer package resin contains an imidazole compound.

5. The solid electrolytic capacitor according to claim 1, wherein the anode is formed of niobium or an alloy mainly based on niobium, or of niobium monoxide.

6. A method of producing a solid electrolytic capacitor, comprising the steps of:

forming an anode containing a valve metal or its alloy;

forming a dielectric layer on the surface of the anode;

forming a cathode on the dielectric layer; and forming an outer package resin so as to cover the anode, the dielectric layer and the cathode, wherein the step of forming the outer package resin includes the step of curing by heat treatment so that a glass transition temperature (Tgb) of the outer package resin becomes a temperature ranging from 0.50 to 0.90 times a maximum glass transition temperature (Tga) which is a maximum value of glass transition temperatures exhibited by the outer package resin after each heat treatment at variable temperatures of every 10° C. from 50° C. to 200° C. (treatment time: 5 hours) which is performed on the outer package resin before the curing process.

7. The solid electrolytic capacitor according to claim 6, wherein a heat treatment temperature (T1) for the curing process is 0.80 or less times a heat treatment temperature (T2) that gives said maximum glass transition temperature (Tga).

* * * * *